(12) United States Patent
Bonci

(10) Patent No.: US 11,297,040 B2
(45) Date of Patent: Apr. 5, 2022

(54) INTERMEDIARY HANDLING OF IDENTITY SERVICES TO GUARD AGAINST CLIENT SIDE ATTACK VECTORS

(71) Applicant: Akamai Technologies Inc., Cambridge, MA (US)

(72) Inventor: Jason C. Bonci, Maynard, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 226 days.

(21) Appl. No.: 16/400,304

(22) Filed: May 1, 2019

(65) Prior Publication Data

US 2020/0351248 A1 Nov. 5, 2020

(51) Int. Cl.
*H04L 9/32* (2006.01)
*H04L 29/06* (2006.01)
*G06F 21/00* (2013.01)

(52) U.S. Cl.
CPC ...... *H04L 63/0281* (2013.01); *H04L 63/0876* (2013.01); *H04L 63/1441* (2013.01); *H04L 63/166* (2013.01)

(58) Field of Classification Search
CPC ............. H04L 63/0281; H04L 63/0876; H04L 63/1441; H04L 63/166; H04L 63/0884; H04L 63/0815; H04L 63/0823
See application file for complete search history.

(56) References Cited

U.S. PATENT DOCUMENTS

| | | | |
|---|---|---|---|
| 6,108,703 A | 8/2000 | Leighton et al. | |
| 7,058,706 B1 | 6/2006 | Iyer et al. | |
| 7,096,263 B2 | 8/2006 | Leighton et al. | |
| 7,096,266 B2 | 8/2006 | Lewin et al. | |
| 7,240,100 B1 | 7/2007 | Wein et al. | |
| 7,249,377 B1 | 7/2007 | Lita et al. | |
| 7,251,688 B2 | 7/2007 | Leighton et al. | |
| 7,274,658 B2 | 9/2007 | Bornstein et al. | |

(Continued)

OTHER PUBLICATIONS

Z. Ahmad, J.-L. Ab Manan and S. Sulaiman, "Trusted Computing based open environment user authentication model," 2010 3rd International Conference on Advanced Computer Theory and Engineering(ICACTE), 2010, pp. V6-487-V6-491, doi: 10.1109/ICACTE.2010.5579171. (Year: 2010).*

(Continued)

*Primary Examiner* — Michael Simitoski

(57) ABSTRACT

This document describes, among other things, security hardening techniques that guard against certain client-side attack vectors. These techniques generally involve the use of an intermediary that detects and handles identity service transactions on behalf of a client. In one embodiment, the intermediary establishes a resource domain session with the client in order to provide the client with desired resource domain content or services from a resource domain host. The intermediary detects when the resource domain host invokes a federated identity service as a condition of client access. The intermediary handles the identity transaction in the identity domain on behalf of the client within the client's resource domain session. Upon successful authentication and/or authorization with an IdP, the intermediary connects the results of the identity services domain transaction to the resource domain.

20 Claims, 5 Drawing Sheets

(56) References Cited

U.S. PATENT DOCUMENTS

| | | | |
|---|---|---|---|
| 7,293,093 B2 | 11/2007 | Leighton et al. | |
| 7,484,002 B2 | 1/2009 | Swildens et al. | |
| 7,523,181 B2 | 4/2009 | Swildens et al. | |
| 7,574,499 B1 | 8/2009 | Swildens et al. | |
| 7,716,367 B1 | 5/2010 | Leighton et al. | |
| 7,725,602 B2 | 5/2010 | Liu et al. | |
| 7,912,978 B2 | 3/2011 | Swildens et al. | |
| 7,925,713 B1 | 4/2011 | Day et al. | |
| 7,996,531 B2 | 8/2011 | Freedman | |
| 8,181,227 B2 | 5/2012 | Lau | |
| 8,195,831 B2 | 6/2012 | Swildens et al. | |
| 8,572,708 B2* | 10/2013 | Barriga | H04W 12/0431 |
| | | | 726/8 |
| 8,769,622 B2 | 7/2014 | Chang et al. | |
| 9,137,131 B1 | 9/2015 | Sarukkai et al. | |
| 9,917,770 B1 | 3/2018 | Ellis et al. | |
| 10,178,095 B2* | 1/2019 | Bathija | H04L 47/10 |
| 10,243,946 B2 | 3/2019 | Sridhar et al. | |
| 11,140,145 B1* | 10/2021 | Sokolov | H04L 9/3213 |
| 2004/0128383 A1* | 7/2004 | Hinton | H04L 63/0807 |
| | | | 709/225 |
| 2007/0234408 A1 | 10/2007 | Burch | |
| 2007/0245414 A1* | 10/2007 | Chan | H04L 9/3234 |
| | | | 726/12 |
| 2008/0059804 A1* | 3/2008 | Shah | G06F 21/41 |
| | | | 713/186 |
| 2012/0151568 A1 | 6/2012 | Pieczul et al. | |
| 2012/0278872 A1* | 11/2012 | Woelfel | G06F 21/10 |
| | | | 726/7 |
| 2015/0121481 A1* | 4/2015 | Venkatanaranappa | |
| | | | H04L 63/0815 |
| | | | 726/5 |
| 2015/0200924 A1* | 7/2015 | Parla | H04L 63/0815 |
| | | | 726/7 |
| 2015/0281204 A1 | 10/2015 | Ellis et al. | |
| 2016/0044124 A1* | 2/2016 | Sarukkai | H04L 67/42 |
| | | | 709/224 |
| 2016/0094539 A1 | 3/2016 | Suresh et al. | |
| 2016/0219060 A1* | 7/2016 | Karunakaran | H04L 63/0815 |
| 2016/0285858 A1* | 9/2016 | Li | H04L 63/0815 |
| 2016/0292694 A1* | 10/2016 | Goldschlag | H04L 63/0272 |
| 2016/0315913 A1* | 10/2016 | Lu | H04L 63/0281 |
| 2018/0103009 A1* | 4/2018 | Eberlein | H04L 63/029 |
| 2018/0359244 A1 | 12/2018 | Cockerill et al. | |

OTHER PUBLICATIONS

P. Lin, S. Menon, S. Patel and L. Lin, "Single Sign-On for multiple unified communications applications," World Congress on Internet Security (WorldCIS-2012), 2012, pp. 110-116. (Year: 2012).*

Counterpart PCT/US2020/030515, International Search Report and Written Opinion, dated Sep. 16, 2020, 14 pages.

Active Directory Security Risk #101: Kerberos Unconstrained Delegation Kor How Compromise of a Single Server Can Compromise the Domain), Downloaded Mar. 8, 2019, https://adsecurity.org/?p=1667, 11 pages.

SAML Tutorial: How SAML Authentication Works—SAML 2.0 SSO Flow Diagram, Overview of SAML, copyright 2015-2019, discussions dated 2016 and earlier, Downloaded on May 1, 2019, 5 pages. https://developers.onelogin.com/saml.

Akamai Technologies, Inc., Create, Issue, and Validate OAuth 2.0 Tokens with API Gateway, Oct. 2018, 14 pages. https://developer.akamai.com/blog/2018/10/10/create-issue-and-validate-oauth-20-tokens-api-gateway.

Campbell, et al., IETF, RFC 7522, May 2015, Security Assertion Markup Language (SAML) 2.0 Profile for OAuth 2.0 Client Authentication and Authorization Grants, 15 pages.

Campbell, et al., IETF, RFC 7521, Assertion Framework for OAuth 2.0 Client Authentication and Authorization Grants, May 2015, obtained at http://www.rfc-editor.org/info/rfc7521, 20 pages.

Cantor, et al., OASIS, Assertions and Protocols for the OASIS, Security Assertion Markup Language, (SAML) V2.0, Oasis Standard, Mar. 15, 2005, 86 pages.

Denniss, et al., IETF, RFC 8252, OAuth 2.0 for Native Apps, Oct. 2017, https://www.rfc-editor.org/info/rfc8252, 21 pages.

Fox, Security on the Move: Indirect Authentication Using Kerberos, downloaded Mar. 8, 2019 from http://citeseerx.ist.psu.edu/viewdoc/download?doi=10.1.1.32.7346&rep=rep1&type=pdf, 10 pages.

Hardt, IETF, RFC 6749, The OAuth 2.0 Authorization Framework, Oct. 2012, http://www.rfc-editor.org/info/rfc6749, 76 pages.

Liang, et al., When HTTPS Meets CDN: A Case of Authentication in Delegated Service, 2014 IEEE Symposium on Security and Privacy, downloaded Mar. 8, 2019 from http://cobweb.cs.uga.edu/~kangli/src/ieeesp2014.pdf, 16 pages.

Nygaard, Kerberos Delegation—Authentication and Authorization, May 3, 2011, downloaded on Mar. 8, 2019, 6 pages. https://blogs.msdn.microsoft.com/autz_auth_stuff/2011/05/03/kerberos-delegation/.

Oasis, Security and Privacy Considerations for the OASIS Security Assertion Markup Language (SAML) V2.0, Mar. 15, 2005, 33 pages. http://docs.oasis-open.org/security/saml/v2.0/.

Oasis, Security Assertion Markup Language (SAML) V2.0 Technical Overview, Mar. 25, 2008, 51 pages.

Onelogin Developers, Overview of SAML web page https://developers.onelogin.com/saml, Sep. 2018, downloaded from Internet Wayback Machine on Jun. 11, 2019, https://web.archive.org/web/20180908020334/https://developers.onelogin.com/saml, 5 pages.

Raible, What the Heck is OAuth?, Downloaded on May 1, 2019, Jun. 21, 2017, https://developer.okta.com/blog/2017/06/21/what-the-heck-is-oauth, 21 pages.

Sakimura, et al., OpenID Connect Core 1.0 incorporating errata set 1, Nov. 8, 2014, https://openid.net/specs/openid-connect-core-1_0.html, 98 pages, downloaded on Mar. 8, 2019.

Saml, https://infosec.mozilla.org/guidelines/iam/saml.html, 3 pages, downloaded Feb. 26, 2019.

Soling, Kerberos Delegation, SPNs and More, (/blog/kerberos-delegation-spns-andmore), downloaded on Mar. 8, 2019, https://www.coresecurity.com/blog/kerberos-delegation-spns-and-more, 10 pages.

Wang, et al., Extending the Security Assertion Markup Language to Support Delegation for Web Services and Grid Services, 2005 IEEE International Conference on Web Services (ICWS 2005), Orlando, FL, Jul. 12-15, 2005, downloaded Mar. 8, 2019 from http://www.cs.virginia.edu/~humphrey/papers/SAML_delegation.pdf, 8 pages.

Wikipedia, OAuth, page version of Apr. 22, 2019, https://en.wikipedia.org/w/index.php?title=OAuth&oldid=893688390, downloaded on May 1, 2019, 8 pages.

Wikipedia, Security Assertion Markup Language, page version dated Apr. 11, 2019, https://en.wikipedia.org/w/index.php?title=Security_Assertion_Markup_Language&oldid=892034665, 12 pages, downloaded May 1, 2019.

* cited by examiner

INTERMEDIARY HANDLING OF IDENTITY SERVICES TO GUARD AGAINST CLIENT SIDE ATTACK VECTORS

BACKGROUND

Technical Field

This application relates generally to network security and to improving the security of identity services.

Brief Description of the Related Art

It is known in the art to provide identity services using a variety of standardized protocols, including SAML, OAUTH, and OpenID. Such protocols enable a client to access a hosted resource requiring authentication and/or authorization by providing client credentials to a separate identity services provider (IdP), so that the client credentials do not need to be shared with the resource host. The identity services are described as "federated" when the party hosting the protected resource is different than the party providing the IdP.

A given identity services transaction typically involves a client requesting access to a protected resource, for example to download particular content or make use of a service. The resource host initiates an identity services workflow that, in general, has the client provide its credentials to an IdP. The IdP verifies these credentials, authenticating the client and in some cases determining the scope of authorization that the client has (and whether it includes the particular requested resource).

Generally speaking, the IdP then provides for the resource host an identity assertion as to the client's authentication and/or authorization status. The client can use this assertion to access the desired resource. Depending on the model and protocol, the IdP may provide the identity assertion directly to the resource host and/or indirectly via the client, or via a combination thereof.

There are several different identity services standards. A brief example of a SAML flow for identity services, assuming HTTP is used at the application layer, is provided in FIG. 1. At 101, the end user client sends a request to the resource host for a protected resource (the relying party or RP, in the nomenclature of SAML). At 102, the RP responds to the client with a redirect to the IdP. At 103, the client follows the redirect to the IdP, presenting a client credential, e.g. a user/password combination, client certificate or the like. Assume the IdP checks the credentials and authenticates the client. At 104, the IdP sends the client a signed SAML assertion. which the client posts to the RP at 105. At 106, the RP verifies the SAML assertion and exchanges it for an RP-specific credential (e.g., a session token). For the remainder of the session, or some other duration, the client can use this RP-specific credential to access the protected resources hosted by the RP. In some implementations, SAML assertions may provide role based authorization parameters, which the RP can use to scope the client's access.

The approach above has many benefits, but it also has certain weaknesses from a security perspective. For example, a SAML assertion could be intercepted over the open Internet as they are passed to the RP. The DNS used by the client can be poisoned, in order to redirect a client intending to reach the IdP or RP to a man in the middle (MITM). BGP hijacking or transparent proxying also could be used to direct client traffic away from the intended IdP target to a MITM, and when combined with well-understood certificate hijacking techniques allow an adversary to capture client credentials.

These attack vectors are more worrisome—and thus particularly relevant—when the client is using an untrusted and weakly secure access network, such as free WiFi in a coffee shop or other quasi-public space. Today's workforce commonly works remotely and uses their devices to access secure workplace resources, making these risks relevant for a wide range of enterprises, governments, and other organizational entities.

Generally speaking, it would be desirable to improve the security of a broad range of identity services (whether delivered via SAML, or otherwise). It is an object of this patent document to describe systems, methods and devices to meet this need. Further, those skilled in the art will understand these and other improvements from the teachings hereof.

BRIEF SUMMARY

This document describes, among other things, security hardening techniques that guard against certain client-side attack vectors. These techniques generally involve the use of an intermediary that detects and handles identity service transactions on behalf of a client. In one embodiment, the intermediary establishes a resource domain session with the client in order to provide the client with desired resource domain content or services from a resource domain host. The intermediary detects when the resource domain host invokes a federated identity service as a condition of client access. In a typical flow, the identity service is provided on an identity domain by a third party identity services provider (IdP); however, in a setup according to the teachings hereof, the intermediary prevents the client from directly establishing or handling the identity domain session. The intermediary handles the identity transaction in the identity domain on behalf of the client within the client's resource domain session. Upon successful authentication and/or authorization with an IdP, the intermediary connects the results of the identity services domain transaction to the resource domain. As a result, the identity services are secured within the resource domain operations on the client-side, mitigating security risks on the client-side.

The foregoing is a brief description of certain non-limiting aspects of the teachings hereof for purposes of illustration only; it is not a definition of the invention. The claims define the scope of protection that is sought, and they are incorporated by reference into this brief summary.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying components being discussed in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, MQTT, TCP/IP, and UDP, is assumed. All references to HTTP should be interpreted to include an embodiment using encryption (HTTP/S), such as when TLS-secured connections are established. The term "server" is used herein to include embodiments using either actual or virtualized hardware (a computer configured as a server, also referred to as an actual or virtualized "server machine") with server software running on such hardware (e.g., a web server). The terms "client" and "client device" are used herein to include embodiments having any combination of hardware with software. Put another way, while context may indicate the hardware or the software exclusively, should such distinction be appropriate, the teachings hereof can be implemented in any combination of hardware and software. The term web page or "page" is meant to refer to a browser or other user-agent presentation defined by an HTML or other markup language document.

Figure 1:
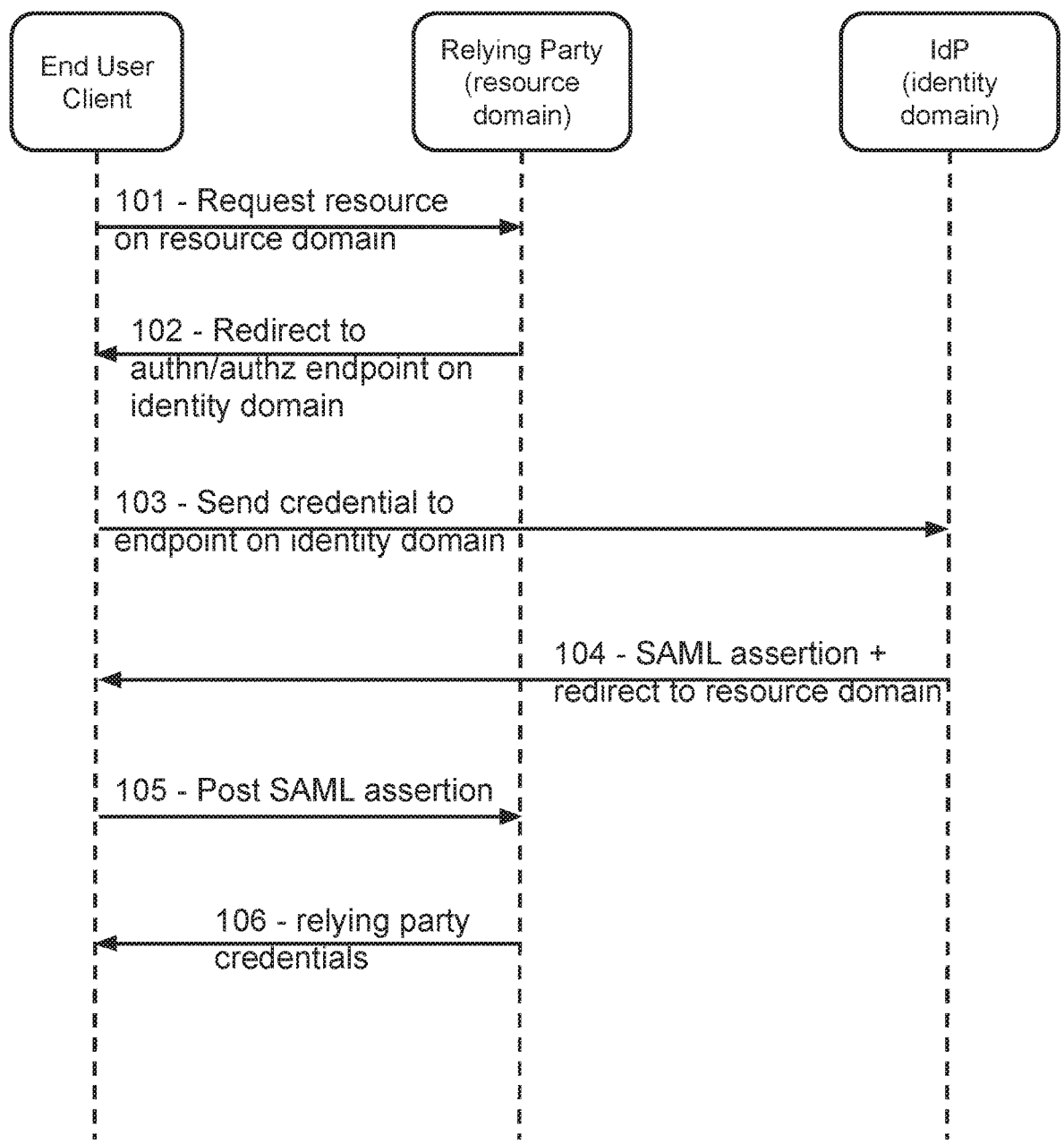
FIG. 1 is a diagram illustrating a prior art federated identity login using SAML.
Figure 2:
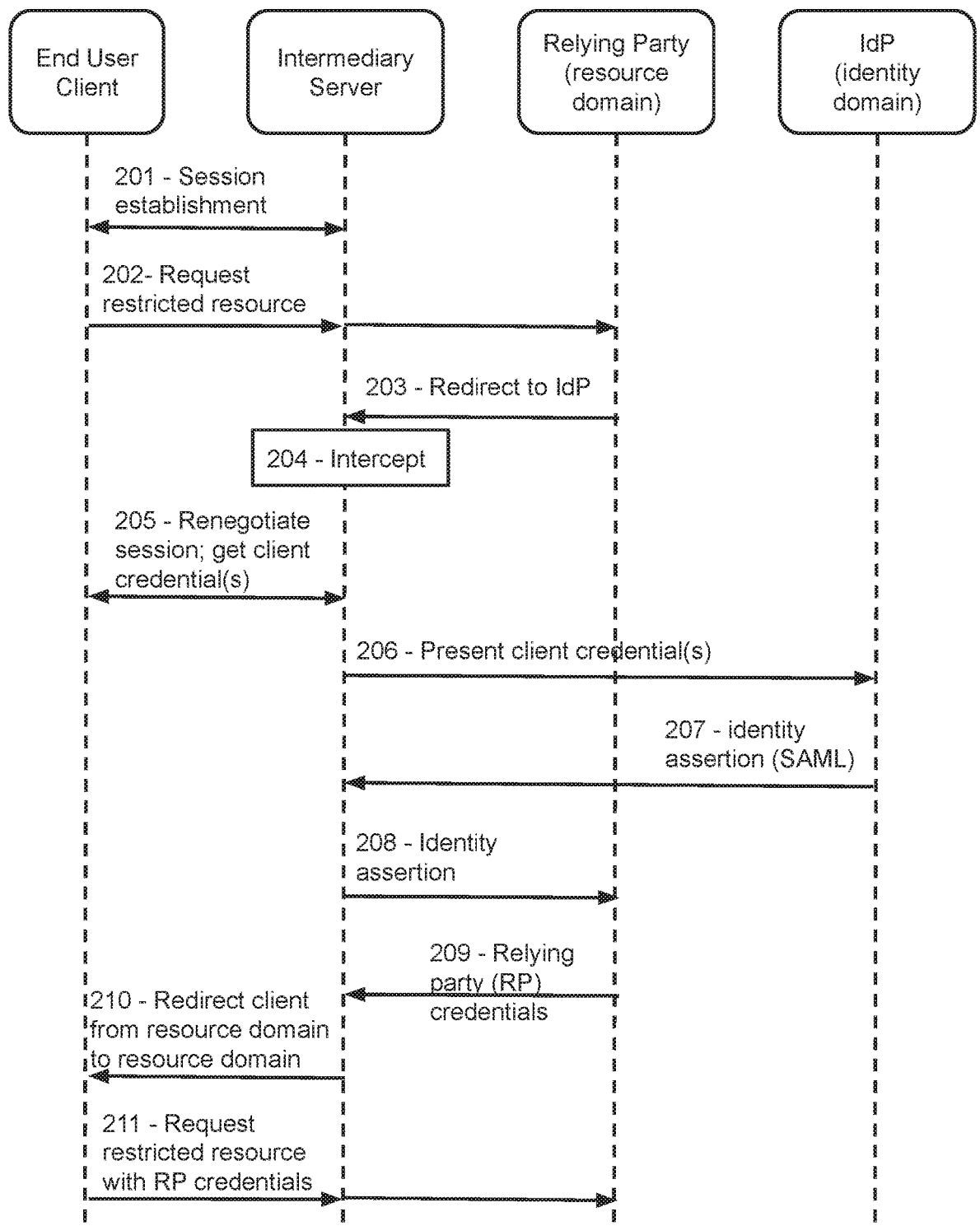
FIG. 2 is a diagram illustrating a federated identity services handled by an intermediary, according to one embodiment of the teachings hereof.

FIG. 2 illustrates a messaging flow amongst an end user (EU) client, an intermediary server, a relying party (RP), and an identity services provider (IdP), in accord with the teachings hereof.

In terms of network equipment, in the embodiment of FIG. 2 the EU client represents a browser or other user agent running on an end user client device. The relying party (RP) block in FIG. 2 represents one or more servers or other network infrastructure run by or on behalf of a party hosting a resource, e.g., a website, web application provider, API services, or otherwise. The RP can provide such resources under a particular resource domain, e.g., 'www.resource-example.com.'

The intermediary server can be a reverse proxy server configured with the necessary credentials (e.g., CA-signed x.509 certificate) to authenticate to the client for serving content from the resource domain. The intermediary server can be, in certain embodiments, an edge server in a content delivery network (CDN).

The identity services provider (IdP) block in FIG. 2 represents one or more servers or other network infrastructure run by or on behalf of a party providing a standards-compliant identity service. The IdP may operate in accord with SAML, OAuth, OpenID, or other standard protocol. Examples herein are based on the SAML model but use of SAML is not a limitation of the teachings hereof; the protocol must only be compatible with and/or extendable to the teachings hereof. The IdP may be provided by an enterprise, or by a third party services provider. The IdP is reachable under an identity services domain, e.g., 'idp-example.com.'

The flow begins at 201, where the EU client and intermediary server establish a session. Typically this is a secure session initiated by the EU client connecting (e.g., via TCP/IP) to the intermediary server and initiating a secure TLS session, as well known in the art, and involving what is often referred to as a TLS handshake. During the TLS handshake the intermediary server provides a certificate, in the usual way known in the art, and this certificate the EU client can verify and use to authenticate the intermediary server as trusted for a given domain, also as known in the art.

In this example, assume that the EU client is attempting to get a resource hosted by the RP, and that the intermediary server has been configured as a reverse proxy server to deliver content authoritatively on behalf of the RP. As a result, the intermediary server is configured to store a certificate for the resource domain of the RP; during the TLS handshake, the EU client receives this certificate and authenticates the intermediary server and therefore trusts it to serve resources under the resource domain. The secure session at 201 is thus established under the resource domain, and the EU client can send one or more requests for resources to the intermediary server (e.g., as HTTP requests). To the extent that the EU client requests public resources that are available at the intermediary server (e.g., in a local cache), the intermediary server can provide them. If the EU client requests a public resource that is not available in the intermediary server, then in a known operation, the intermediary server can fetch that resource from the RP and serve it to the EU client (potentially caching it for future use with other clients).

At 202, assume that the EU client sends a request for a restricted-access resource. Restricted access resource refers to any content, service, or otherwise for which the RP requires that the EU client be authenticated and/or authorized.

When the intermediary server goes forward to fetch such a resource from the RP, the RP recognizes that the requested resource requires authentication and/or authorization of the EU client. Hence it responds with a redirect (e.g., an HTTP 302, if using HTTP as the application layer) to the IdP. This is step 203 in FIG. 2. The redirect is to an endpoint in the identity domain (e.g., the prefix https:// followed by 'idp-example.com/auth'). The requested resource at the RP may be passed as a URL parameter.

At 204, the intermediary server examines the response from the RP and detects the redirect. Rather than passing the redirect back to the EU client, as would be the case in the prior art, the intermediary server instead captures this redirect and prevents it from reaching the EU client. The intermediary server responds to the redirect by dynamically and synchronously obtaining credentials from the EU client, which the intermediary service will use in an identity services transaction with the IdP.

In one embodiment, shown at 205, the intermediary server obtains the EU client credentials by instructing the EU client to renegotiate the secure resource domain session. The TLS handshake is repeated, this time populating the fields of requested client certificates in its ServerHello message or other future state message structure. In response, the EU client provides its certificate, which the intermediary server can optionally verify.

In another embodiment, the intermediary server could redirect the EU client to a custom page constructed by the intermediary server and prompting the user to login with user credentials.

Step 205 occurs under the resource domain. That is, the EU client is never presented with a redirect to the identity domain, and preferably all communications are in-band to the secure session, and thus encrypted according to the negotiated TLS ciphers of the resource domain session. This means the fact that the EU client needs to complete an IdP transaction is shielded from an attacker in the network between the EU client and the intermediary server. As noted above, often an EU client may be in an untrusted access network (e.g., an employee using their enterprise laptop on Wifi at a coffee shop). If the EU client were to initiate the IdP transaction, it may necessitate (for example) a DNS lookup in the untrusted access network to the IdP domain. Using the teachings hereof, this is avoided and instead the intermediary server (which is inherently more secure) is tasked with this operation. Other aspects of the identity transaction, such as SAML assertions, are likewise hidden. Generalizing, the identity domain transaction is hardened against a variety of attack vectors by hiding the IdP domain transaction within the previously-established encrypted channel under the resource domain.

At step 206, the intermediary server follows the redirect. This may involve executing a DNS lookup on the domain name for the IdP and initiating a secure session under the identity domain with the IdP, e.g., using a TLS handshake and with the IdP providing its server certificate for the identity domain and otherwise in the manner previously described and known in the art.

Continuing at step 205, the intermediary server constructs a request (e.g., HTTP POST), and includes the EU client credential(s) that the intermediary server obtained in step 205. The IdP validates the EU client credential(s) and responds with a set of IdP-issued identity assertions that make claims about the identity of the EU and/or the EU client (and may also include assertions as to the authorization scope of the EU client). In this embodiment, assume the identity assertions are SAML assertions. The intermediary server receives the SAML and provides them to the RP, at step 208. Again, note that the SAML assertions are prevented from reaching the EU client in this transaction—they do not even travel over the link between the EU client to intermediary server—thereby mitigating risk associated with the EU client and/or EU client access network.

At step 209, the RP examines and validates the SAML assertions from the IdP, thereby authenticating and if needed authorizing the EU client for access to restricted access resources hosted by the RP. IN response, the RP issues to the EU client a set of one or more credentials from the RP. Such credentials may be limited in time and/or limited to the current session of the EU client, as known in the art. The credentials are referred to as the RP credentials in FIG. 2. The RP credentials are scoped to (valid for) the resource domain.

At 210, the intermediary server stores the RP credentials on the EU client in association with the resource domain. This enables the EU client to provide them when making subsequent requests for resources under the resource domain. In this embodiment, the intermediary server accomplishes this by issuing a redirect to the EU client from the resource domain to the resource domain, and attaching the RP credentials as a cookie. In other words, the intermediary server sets a cookie on the EU client under the resource domain holding the RP credentials.

At 211, the EU client can make any number of subsequent requests for resources under the resource domain, including the RP credentials. The intermediary server proxies these requests to the RP, which provides the requested content and/or services. The RP verifies the RP credentials and provides the requested resources.

Figure 3:
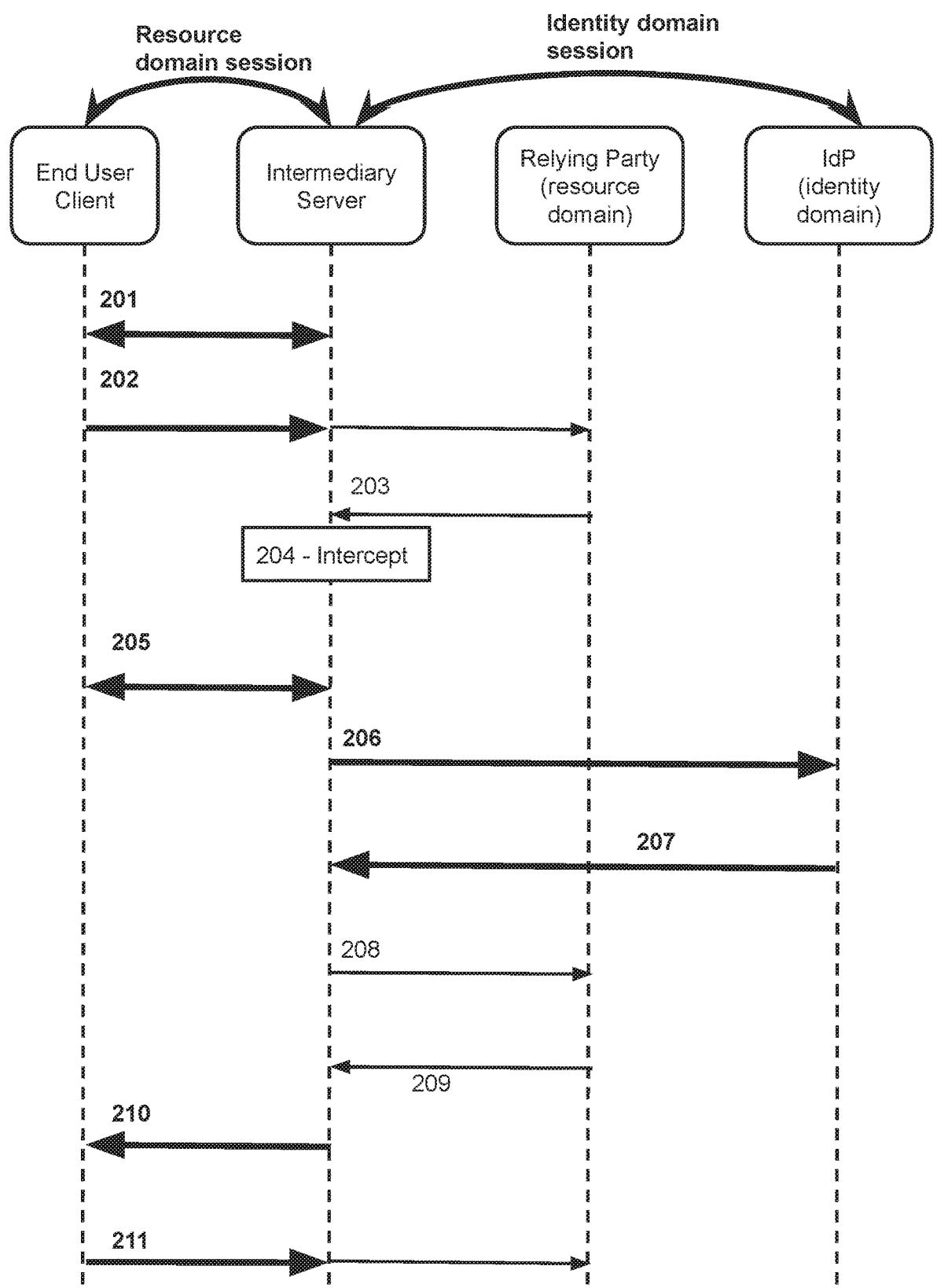
FIG. 3 is a diagram highlighting the resource domain session and identity domain session in FIG. 2.

The separation of the resource domain session from the identity domain is highlighted in FIG. 3, which is identical to FIG. 2 but includes the labeling at the top. Those labels indicate that the resource domain session, in which the client is retrieving or attempting to retrieve a resource via the intermediary server from the RP, encompasses message exchanges 201, 202, 205, 210, 211. Message 203, which would send the client to the identity domain, is intercepted at 204. The identity domain session comprises message exchanges at 206 and 207.

Figure 4:
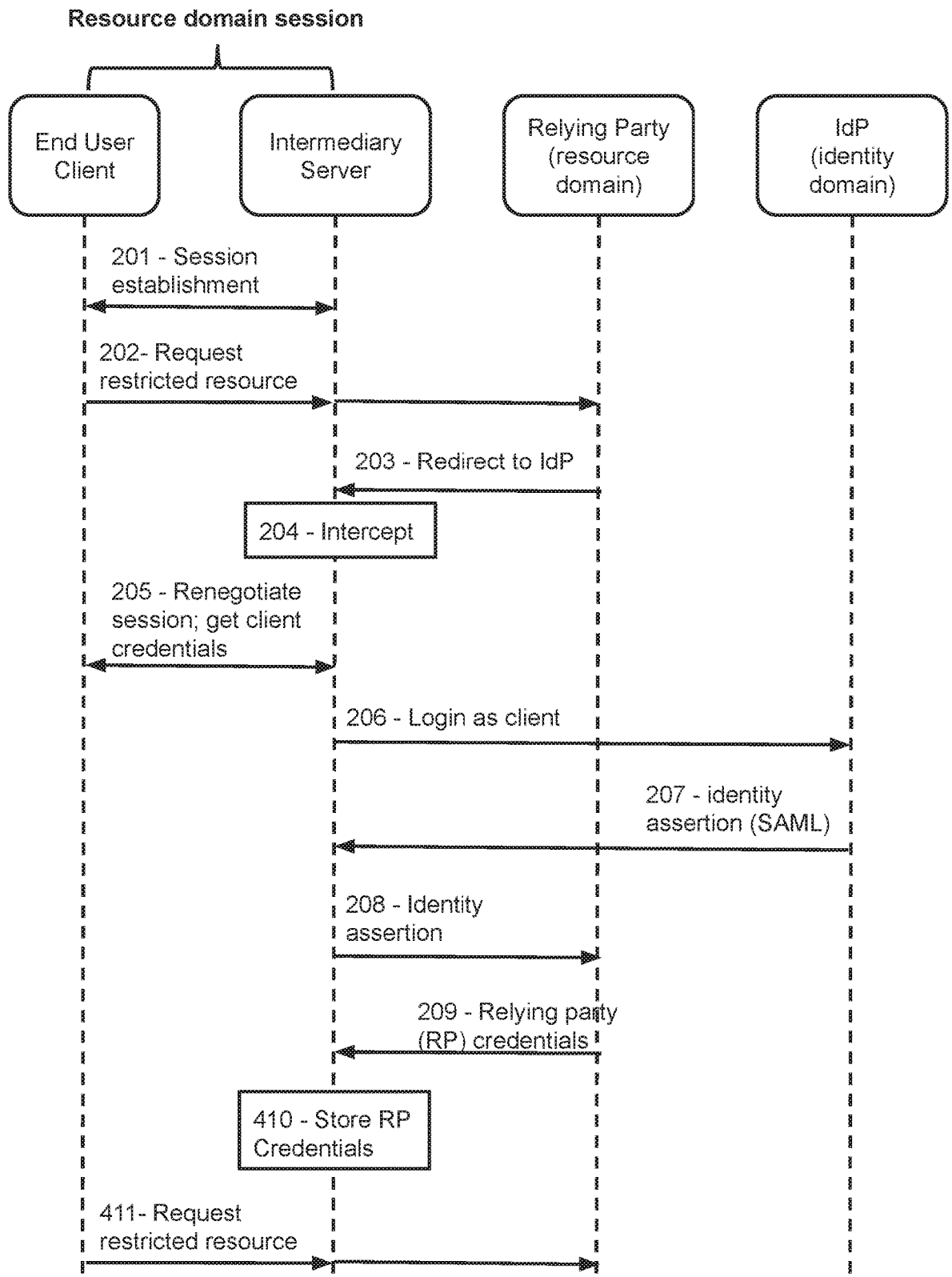
FIG. 4 is a diagram illustrating a federated identity services handled by an intermediary, according to one embodiment of the teachings hereof; and, FIG. 5 is a block diagram illustrating hardware in a computer system that may be used to implement the teachings hereof.

FIG. 4 is an alternative embodiment. FIG. 4 is largely the same as FIG. 2. However, in FIG. 4 the intermediary server does not store the RP credentials on the EU client. Instead, the intermediary server stores the RP credentials in a local data store and associates them with the EU client and the given resource domain session. This is 410. When the EU client sends a request for a restricted resource (as shown in 411), the intermediary server proxies that request to the RP and adds the RP credentials for the EU client, as it does. The embodiment shown in FIG. 4 provides an added measure of safety, as the RP credentials never touch the EU client. Should the EU client disconnect from the proxy, the proxy can internally destroy those credentials, forcing the user to reconnect or re-establish the session. In some implementations, the proxy can make a determination to keep those RP credentials available for a certain time for EU client convenience.

Intermediary Server Implementation as Standalone or Adjunct to IdP

While the description above and the FIGURES appended show the intermediary server as a standalone device that communicates with the IdP, that arrangement is not necessary. The intermediary server can be realized in a variety of ways. In some implementations, the functions of the intermediary server can be integrated into the IdP. This may be accomplished by coding the intermediary server as a process to be executed on the IdP host, as a plugin to the IdP software, or in any other way.

Use in Content Delivery Networks (CDNs)

As mentioned above, the intermediary server may be an edge server in a CDN. CDN technologies, including examples of request routing mechanisms using DNS or otherwise, and edge server technologies are described in at least the following documents, the teachings of which are hereby incorporated by reference in their entireties: U.S. Pat. Nos. 6,108,703; 7,293,093; 7,096,263; 7,096,266; 7,484,002; 7,523,181; 7,574,499; 7,240,100; 7,725,602; 7,716,367; 7,996,531; 7,925,713; 7,058,706; 7,251,688; 7,274,658; 7,912,978; 8,195,831.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
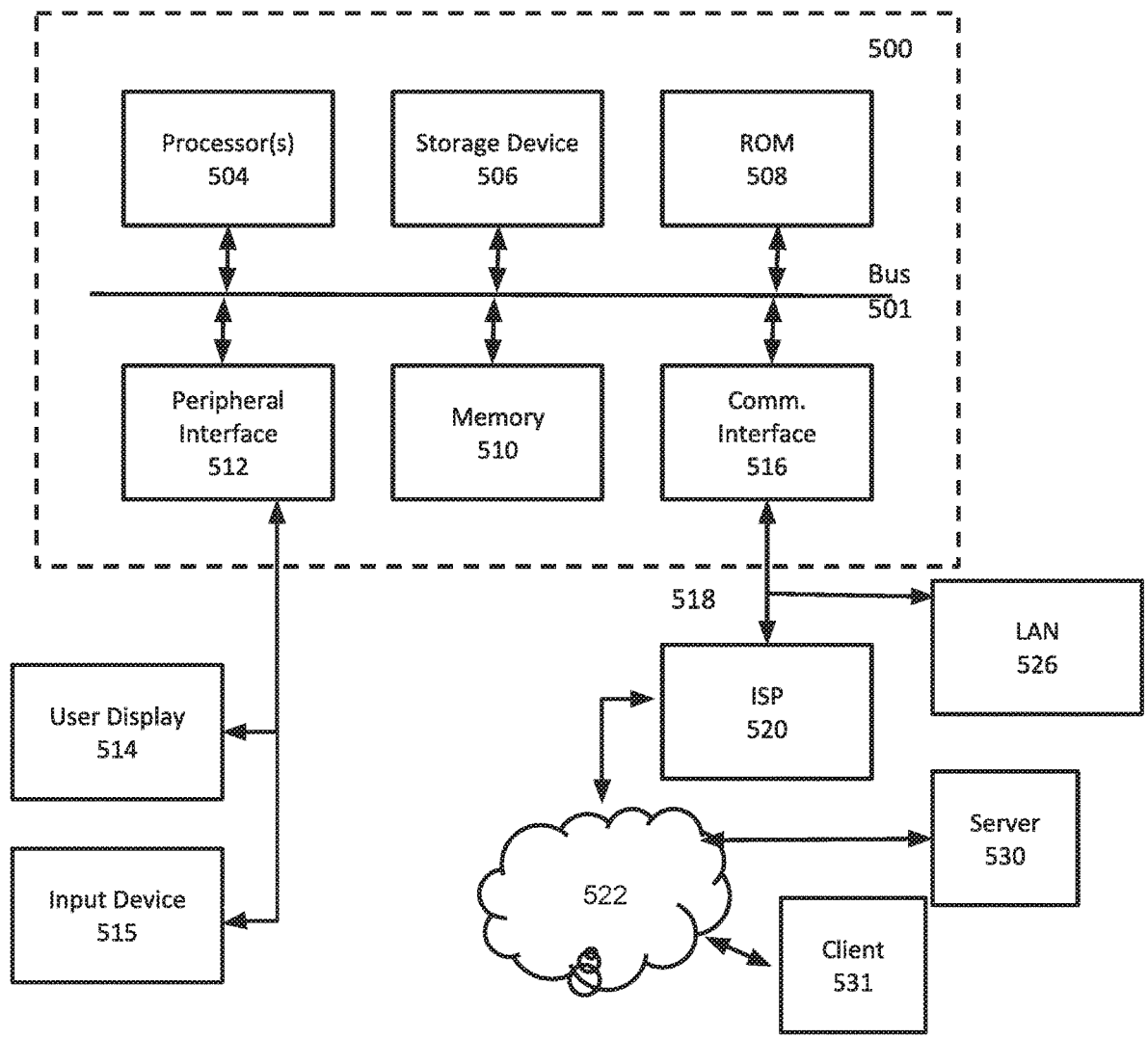

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 500 includes a microprocessor 504 coupled to bus 501. In some systems, multiple processors and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. Note that the computer system 500 may be operated remotely and need not have a local user interface. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer) between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, SSD, CD-ROMs, optical media, RAM, PROM, EPROM, and EEPROM, flash memory.

Any other non-transitory computer-readable medium may be employed. Executing code may also be read from network link 518 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method performed by an intermediary server, the intermediary server being deployed on a network path in between a client and a host, the host associated with a relying party, the intermediary server being remote from the client, the method comprising:

establishing a secure session on a resource domain with a client;

within the secure session, receiving a request for a resource hosted under the resource domain;

proxying the request for the resource from the client to a relying party (RP) host acting as origin for the resource domain;

intercepting a redirect sent from the RP host to redirect the client from the resource domain to an identity services provider (IdP) domain, said interception performed to prevent the redirect from reaching the client;
in response to intercepting the redirect, prompting the client for a client credential, said prompting occurring within the secure session on the resource domain;
receiving the client credential within the secure session on the resource domain;
independent of the client, performing the following actions:
following the redirect to contact an IdP host on the IdP domain, and providing the client credential to the IdP host to obtain an identity assertion from the IdP host, and
sending the identity assertion to the relying party to obtain therefrom a resource domain credential for the client, the resource domain credential being distinct from the client credential;
once the resource domain credential for the client is obtained, associating the resource domain credential with the secure session on the resource domain between the client and the intermediary server, where said associating comprises any of:
storing the resource domain credential on the intermediary server on behalf of the client, and
storing the resource domain credential on the client under the resource domain;
after said association of the resource domain credential with the resource domain secure session between the client and the intermediary server:
proxying a request from the client to the RP host for the resource and including the resource domain credential with the proxied request.

2. The method of claim 1, where the associating comprises:
storing the resource domain credential on the intermediary server on behalf of the client.

3. The method of claim 1, where the associating comprises:
storing the resource domain credential on the client under the resource domain.

4. The method of claim 3, further comprising performing said storing of the resource domain credential on the client under the resource domain at least by:
within the secure session under the resource domain, sending the client a redirect from the resource domain to the resource domain, and attaching the resource domain credential to said redirect.

5. The method of claim 4, wherein the resource domain credential is set as a cookie.

6. The method of claim 1, wherein said prompting the client for the client credential comprises:
renegotiating the secure session with the client.

7. The method of claim 1, wherein said establishing the secure session on the resource domain with the client comprises: the intermediary server presenting a resource domain certificate to authenticate to the client for serving resources under the resource domain.

8. The method of claim 1, wherein the intermediary server comprises a reverse proxy server.

9. The method of claim 1, wherein the secure session comprises a transport layer security (TLS) session.

10. The method of claim 1, wherein the IdP host comprises a SAML-compliant host and the identity assertion comprises a SAML assertion.

11. An apparatus comprising:
an intermediary server deployed on a network path in between a client and a host, the host associated with a relying party (RP host), the intermediary server deployed remote from the client;
the intermediary server comprising one or more processors and memory holding instructions that when executed on the one or more processors cause the intermediary server to:
establish a secure session on a resource domain with a client;
within the secure session, receive a request for a resource hosted under the resource domain;
proxy the request for the resource from the client to the RP host acting as origin for the resource domain;
intercept a redirect sent from the RP host to redirect the client from the resource domain to an identity services provider (IdP) domain, said interception performed to prevent the redirect from reaching the client;
in response to intercepting the redirect, prompt the client for a client credential, said prompting occurring within the secure session on the resource domain;
receiving the client credential within the secure session on the resource domain;
independent of the client, perform the following actions:
follow the redirect to contact an IdP host on the IdP domain, and providing the client credential to the IdP host to obtain an identity assertion from the IdP host; and
send the identity assertion to the relying party to obtain therefrom a resource domain credential for the client, the resource domain credential being distinct from the client credential;
once the resource domain credential for the client is obtained, associate the resource domain credential with the secure session on the resource domain between the client and the intermediary server, where said associating comprises any of:
store the resource domain credential on the intermediary server on behalf of the client, and
store the resource domain credential on the client under the resource domain;
after said association of the resource domain credential with the resource domain secure session between the client and the intermediary server: proxy a request from the client to the RP host for the resource and including the resource domain credential with the proxied request.

12. The apparatus of claim 11, where the associating comprises:
storing the resource domain credential on the intermediary server on behalf of the client.

13. The apparatus of claim 11, where the associating comprises:
storing the resource domain credential on the client under the resource domain.

14. The apparatus of claim 13, further comprising performing said storing of the resource domain credential on the client under the resource domain at least by:
within the secure session under the resource domain, sending the client a redirect from the resource domain to the resource domain, and attaching the resource domain credential to said redirect.

15. The apparatus of claim 14, wherein the resource domain credential is set as a cookie.

16. The apparatus of claim 11, wherein said prompting the client for the client credential comprises:
renegotiating the secure session with the client.

17. The apparatus of claim 11, wherein said establishing the secure session on the resource domain with the client comprises: the intermediary server presenting a resource domain certificate to authenticate to the client for serving resources under the resource domain.

18. The apparatus of claim 11, wherein the intermediary server comprises a reverse proxy server.

19. The apparatus of claim 11, wherein the secure session comprises a transport layer security (TLS) session.

20. The apparatus of claim 11, wherein the IdP host comprises a SAML-compliant host and the identity assertion comprises a SAML assertion.

\* \* \* \* \*